United States Patent [19]

Biondetti et al.

[11] Patent Number: 4,501,040
[45] Date of Patent: Feb. 26, 1985

[54] METHOD AND APPARATUS FOR WASHING STOCK SUSPENSIONS BY REMOVING UNDESIRED MATERIAL THROUGH AN ENDLESS WIRE

[75] Inventors: Mario Biondetti, Schio, Italy; Roland Baur, Weingarten, Switzerland

[73] Assignee: Escher Wyss GmbH, Ravensburg, Fed. Rep. of Germany

[21] Appl. No.: 405,525

[22] Filed: Aug. 5, 1982

Related U.S. Application Data

[63] Continuation of Ser. No. 226,200, Jan. 19, 1981, abandoned.

[30] Foreign Application Priority Data

Feb. 6, 1980 [CH] Switzerland ............................ 931/80

[51] Int. Cl.³ ............................................... D21C 9/06
[52] U.S. Cl. ........................................ 8/156; 68/22 R; 68/45; 162/60; 162/56; 162/318; 210/401; 210/783
[58] Field of Search ............... 162/203, 208, 210, 217, 162/190, 303, 304, 306, 310, 264, 275, 276, 317, 318, 335, 357, 55, 56; 68/45, 22 R; 210/400, 401, 408, 783, 409; 8/156

[56] References Cited

U.S. PATENT DOCUMENTS

| | | | |
|---|---|---|---|
| 3,056,719 | 10/1962 | Webster | 162/203 |
| 3,543,834 | 12/1970 | Stuebe | 162/303 |
| 3,616,660 | 11/1971 | Ingermarsson | 60/22 R |
| 3,741,388 | 6/1973 | Tukahashi | 210/400 |
| 3,846,232 | 11/1974 | Kankaanpaa | 162/357 |
| 3,878,698 | 4/1975 | Friksson et al. | 68/22 R |
| 3,923,595 | 12/1975 | Tokuno | 162/318 |
| 4,028,174 | 6/1977 | Myren | 162/264 |
| 4,153,504 | 5/1979 | Justus | 162/203 |

Primary Examiner—Steve Alvo
Attorney, Agent, or Firm—Werner W. Kleeman

[57] ABSTRACT

A method of, and wire machine for, washing stock suspensions is disclosed wherein a cylinder having a solid smooth surface is encircled along a portion of its circumference by an endless wire or filter band. The stock suspension which is to be dewatered is infed between the solid cylinder and the wire by means of a flat jet nozzle. After throughflow of the stock suspension between the cylinder and the wire the dewatered fiber material is removed from the wire and the cylinder, respectively, collected in a collecting container and delivered for further processing.

13 Claims, 1 Drawing Figure

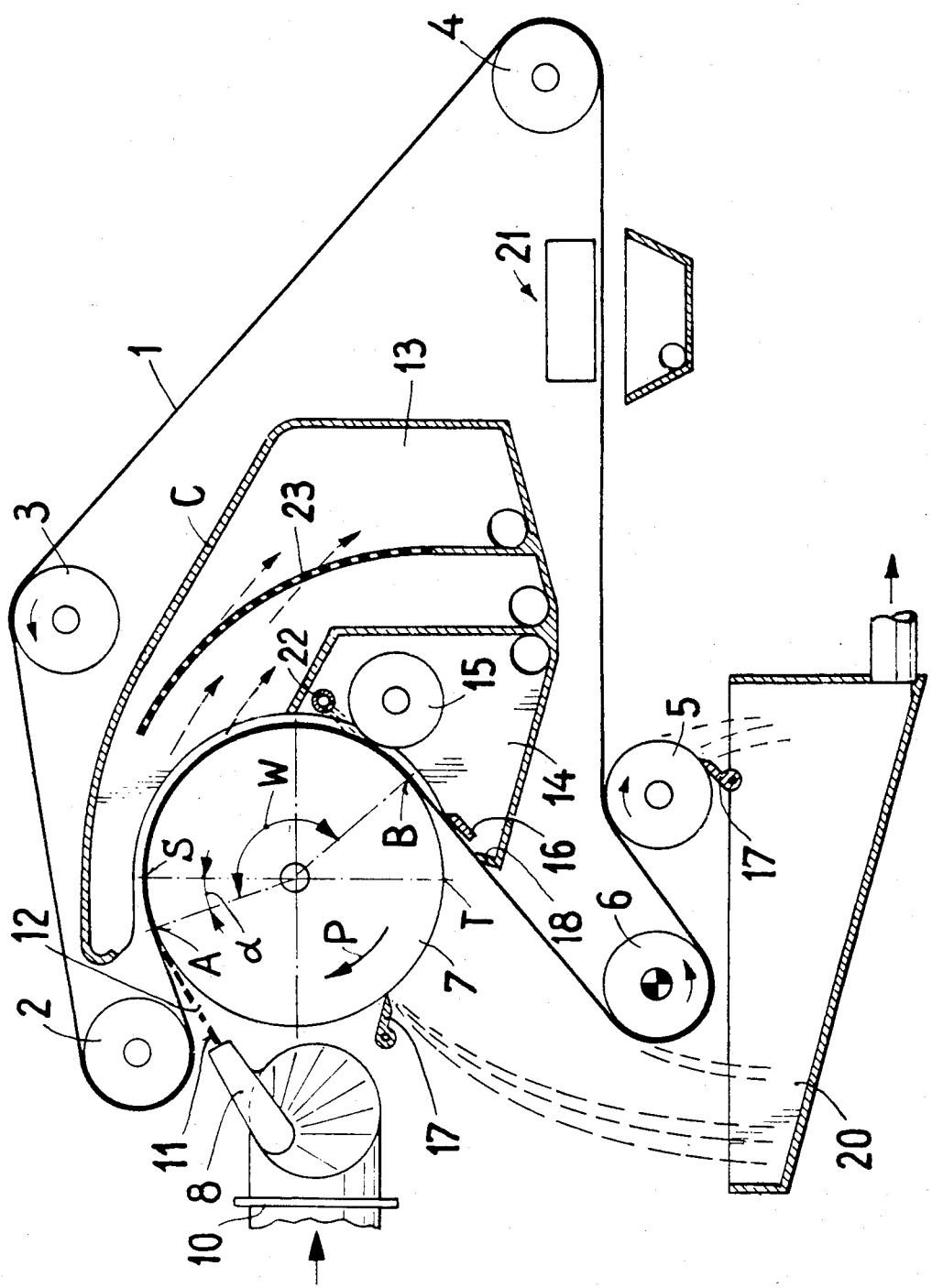

METHOD AND APPARATUS FOR WASHING STOCK SUSPENSIONS BY REMOVING UNDESIRED MATERIAL THROUGH AN ENDLESS WIRE

CROSS REFERENCE TO RELATED APPLICATION

This application is a continuation application of our commonly assigned, copending U.S. application Ser. No. 06/226,200, filed Jan. 19, 1981, now abandoned and entitled "Filter or Wire Machine".

BACKGROUND OF THE INVENTION

The present invention broadly relates to the papermaking art and, in particular, concerns a new and improved method of, and filter or wire machine for washing stock suspensions, which contains an endless revolving wire or filter band to which there is infed, in the form of a stock suspension, the material which is to be washed.

During the treatment of aqueous fiber stock suspensions obtained from waste paper there are employed wire or filter devices—sometimes also referred to as screening or sieve devices—by means of which the fiber stock suspension is thickened. During an operating procedure, generally referred to as washing, there are thus removed from the stock suspension fine materials or fines such as, for instance, ash or cinder materials, broken fiber pieces and so forth. The known wire or filtering devices, for instance inclined wires or filters, curved wires, drum thickeners and so forth, as a washing assembly possess the drawback that their degree of washing or cleaning is extremely limited, and therefore, there are required a number of washing stages with related intermediate thinning of the stock suspension. Additionally, they have a faulty operational reliability since, in particular, the inclined wire and the curved wire are extremely prone to clogging. As a rule, the heretofore known wire or filter devices containing a multi-stage construction require a large amount of space and are accordingly complicated and cumbersome to fabricate and operate.

U.S. Pat. No. 3,616,660, granted Nov. 2, 1971 discloses an apparatus for washing fibrous material which contains a rotatable drum having a perforated shell constituted by a perforated body covered with a foraminous wire. The shell is permeable to liquids but substantially impermeable to the fibrous material undergoing treatment. A foraminous belt, in the form of a wire mesh, is looped around the drum surface and moves conjointly therewith. At a point near to where this belt is lead to the drum surface there is provided a curved plate defining in conjunction with the drum surface a web-forming zone. A rigid liquid-pervious member, again for instance a perforated plate, extends from a point adjacent to the end of the curved plate over another portion of the drum surface, and is formed and positioned relative to the drum surface to define a separate washing zone. Such construction of washing apparatus is extremely complicated and requires specially designed components for forming the same. Moreover, the perforated drum is prone to clog, and the lower portion of the drum collects liquid removed from the fibrous material which undesirably can be then reintroduced back into the incoming suspension of fibrous material, thereby rendering more difficult the dewatering and washing of the fibrous material. Also the design is laid out such that the washing liquid must be introduced at a separate location into the washing zone which follows the web-forming zone. At the outlet end of the equipment there is removed the processed web.

SUMMARY OF THE INVENTION

Therefore, with the foregoing in mind it is a primary object of the present invention to provide a new and improved method of, and wire machine for washing a stock suspension which is not associated with the aforementioned drawbacks and limitations of the prior art constructions.

Another and more specific object of the present invention aims at providing a new and improved construction of wire machine which is intended to accomplish the aforementioned purposes, requires very little space and possesses a good dewatering capacity and independent thereof a good cleaning or washing action with high operational reliability of the equipment.

Still a further significant object of the present invention aims at providing a new and improved construction of a wire or filter machine for use in paper fabrication, which machine is relatively simple in construction and design, quite economical to manufacture, extremely reliable in operation, requires very little maintenance and servicing, and has modest space requirements.

Now in order to implement these and still further objects of the invention, which will become more readily apparent as the description proceeds, the wire or filter machine of the present development is manifested by the features that there is provided a cylinder or cylinder member about a portion of whose circumference there is trained or wrapped a wire or filter band or equivalent structure. An infeed device serves for forming a substantially flat jet of the stock suspension which is directed into a substantially wedge-shaped intermediate space between the cylinder and the wire band which travels thereon. Also, there is provided a removal device for the removal of the solid constituents of the stock suspension from the cylinder and the wire, respectively, the solid constituents remaining between the cylinder and the wire.

In certain of its more specific aspects the rotatable cylinder is advantageously constituted by a solid cylinder, thereby eliminating any danger of clogging perforations or the like as would otherwise arise when using a perforated cylinder. Equally, the liquid extracted from the stock suspension cannot pass into the interior of the solid cylinder where it would be difficult to remove and possibly also could again come into undesirable contact with the stock suspension. The wire is trained and tensioned against the surface of the solid cylinder throughout the major part of the web forming region defined between the run-on and lift-off location of the wire with respect to the solid cylinder. The infeed device for forming the substantially flat jet of the stock suspension contains the washing liquid, so that the web-forming portion or zone also simultaneously constitutes the actual washing zone for washing the stock suspension. The web formed between the wire and the solid cylinder is intentionally destroyed upon its discharge from the equipment.

In the U.S. Pat. No. 3,056,719, granted Oct. 2, 1962, there is disclosed to the art a papermaking machine which contains a cylinder about a portion of whose circumference there is wrapped a wire or filter band. The liquid stock or stock suspension is infed by means of a headbox in the form of a flat jet into a wedge-shaped intermediate space between the cylinder and the wire band which travels thereon. With this machine the formed fiber fleece or web remains at the wire and is dried and processed into paper. Due to the difficulties associated with the detachment of the fiber web from the cylinder, which must possess a solid smooth surface, it has not heretofore been possible to put into actual practice this relatively simple papermaking machine.

On the other hand, with the inventive wire machine and method of washing stock suspensions, the fiber web formed between the cylinder and the wire, following its dewatering, is intentionally destroyed and is further processed in the form of a collected thickened suspension. Therefore it is unimportant whether it remains adhering to the cylinder or the wire after its passage through the wrap angle of the wire at the cylinder.

By virtue of the invention there is obtained a novel construction of machine and method of operating the same for washing suspensions of fibrous materials which makes use of a basically known principle, and particularly utilizes its advantages while overcoming the drawbacks of the prior art machine which heretofore precluded adaptation of such prior art equipment into practical applications.

Although in the first instance the inventive machine is used for dewatering and washing an aqueous fiber stock suspension obtained from waste paper, it generally also can be employed for filtering other materials which are infed in the form of a suspension in a liquid.

Preferably, the run-on or contact line of the wire at the cylinder can be located angularly offset at the region of the apex location of the cylinder, and specifically, viewed opposite to the direction of rotation of the cylinder, through an angle which is smaller than 45°, and the run-off or lift-off location or line of the wire from the cylinder can be arranged at the region of the lower cylinder half, and specifically, forwardly of the lowest position of the cylinder viewed in its direction of rotation. Due to these measures it is possible, with a large wrap angle of the filter or wire band at the cylinder, which can amount to preferably 140° to 180°, to obtain a faultless removal of the obtained good stock from the cylinder and from the wire, augmented by the action of the force of gravity. However, it should be understood that it is conceivable to employ also other angular orientations or positions of the run-on line and the run-off line.

Additionally, the cylinder can be equipped with at least one contact or pressing roll for pressing the wire against its cylinder surface. In this way there is realized a so-called register roll effect which further augments or enhances the dewatering of the material through the action of a pressure pulse and the formation of a suction action following the pressure location of the contact or pressing roll.

The dewatering of the material remaining upon the wire or filter following the run-off location can thus be further augmented in that the wire at the region of the run-off or lift-off location from the cylinder, viewed in the direction of movement of such wire, is equipped with at least one dewatering element.

Preferably, the cylinder can have operatively associated therewith a catch or receiving container which has at least two compartments or chambers which are operatively associated with different portions of the wrap angle of the wire at the cylinder. The water which is sprayed by the wire at different portions or sections contains different contaminants and in different densities, so that the waste water effluxing from such chambers can be differently treated.

Moreover, the catch container can be provided with a perforated partition or separation wall which is pervious for the water. Due to this measure it is possible to undertake, under the action of the kinetic energy of the water, precleaning of such water and, on the one hand, the water which effluxes through the partition wall is partially cleaned and, on the other hand, the eliminated contaminants remaining forwardly of the wire are concentrated.

BRIEF DESCRIPTION OF THE DRAWING

The invention will be better understood and objects other than those set forth above, will become apparent when consideration is given to the following detailed description thereof. Such description makes reference to the annexed drawing wherein the single FIGURE schematically illustrates an exemplary embodiment of wire or filter machine according to the invention and useful for practising the method aspects of the invention.

DETAILED DESCRIPTION OF THE PREFERRED EMBODIMENT

Describing now the drawing, the exemplary embodiment of wire or filter machine shown in the single figure thereof will be seen to contain a wire or filter 1 having the form of an endless band. This wire 1 is guided over guide rolls 2, 3 and 4, a take-off roll 5, a drive roll 6 and a rotatable cylinder or cylinder member 7. The wire band or wire 1 travels onto the cylinder 7 at a substantially line-shaped run-on location A and travels off of the cylinder 7 at a run-off line or location B.

As will be seen by referring to the drawing, the run-on location A is spaced from the apex portion or location S of the cylinder 7 through an angle α, and specifically opposite to the rotational direction of the cylinder 7 which has been indicated by the arrow P, this cylinder 7 co-rotating with the wire 1.

The run-off or lift-off location B of the wire 1 from the cylinder 7 is located at the region of the lower cylinder half, and specifically, viewed in the direction of rotation of the cylinder 7, before its lowest position or location T.

As will be further seen by inspecting the single figure of the drawing, the inventive wire machine is provided with a flat jet nozzle 8 which is connected with a suitable tubular conduit or line 10 through which there is infed to the wire machine the material which is to be sieved or filtered, normally an aqueous fiber stock suspension which is obtained from waste paper and which contains any washing liquid which might be used. The nozzle or nozzle means 8 forms a flat suspension jet 11 which is introduced and directed into a substantially wedge-shaped intermediate space 12 between the wire 1 and the cylinder 7.

At the region of the wrap angle W of the wire 1 at the cylinder 7 there is arranged at the solid cylinder 7 a catch container or receiver C having two chambers 13 and 14 for the pressed-out water which contains the expressed or separated-out contaminants. At the region of the chamber 14 there is operatively associated with the cylinder 7 a press or contact roll 15. The catch container C is provided with a dewatering element such as suction ledge 16, here shown as a foil, but another equivalent device can be used, following which the wire 1 is moved over a scraper edge or scraper 18 of the catch container C.

As will also be clearly recognized by inspecting the single figure of the drawing, the cylinder 7 and the take-off roll 5 are provided with scrapers 17 or equivalent structure which ensure that the material respectively adhering at the cylinder 7 and remaining at the wire band 1 and pressed and removed by the take-off roll 5 is detached from such cylinder 7 and take-off roll 5 and drops into a collecting container 20 from which such removed material can be delivered for further processing.

Between the rolls 5 and 4 there is located a cleaning device 21 which, for instance, can contain spray nozzles, scrapers and so forth, and serves for the cleaning of the wire 1 before the related wire section again arrives at the region of the nozzle 8.

The flat jet nozzle 8 forms from the stock suspension a substantially flat material jet which is directed between the cylinder 7 having the smooth cylinder surface and the wire 1.

The infed stock suspension thereafter is dewatered by the wire tension at the region of the wrap angle W, and the separated-out water together with the contaminants drops into the chambers 13 and 14. The wire 1 is tensioned against the surface of the solid cylinder 7 at least throughout the major part of the web forming zone located between the wire run-on location A and the wire run-off location B and which zone also defines the washing zone. Two chambers 13 and 14 are provided so that the waste water emanating from two regions or zones, which can contain different properties, can be separately processed. Thus, for instance, the waste water from the chamber 14 might have less contaminants than the waste water effluxing out of the chamber 13.

During a typical washing operation, during which an aqueous fiber stock suspension obtained from waste paper is cleaned of the aforementioned contaminants, such as for instance mineral pigments, printing inks, pieces of broken fibers and so forth, the stock suspension to be cleaned or washed is infed through the tubular conduit 10 at a consistency of less than 1.5%, preferably 0.4 to 0.8%.

The wire machine can be preferably operated during the washing operation such that the fiber web or the like formed between the cylinder 7 and the wire 1 has a weight of less than 100 grams per square meter, preferably 30 to 70 grams per square meter. The wire speed and the circumferential speed of the cylinder 7 can be in the order of about 400 to 1,200 meters per minute. The wrap angle W of the wire 1 about the cylinder 7, that is to say, the angular spacing of the points A and B from one another, preferably can be in the order of 140° to 180°.

The fiber web or fleece which is formed between the wire 1 and the cylinder 7 has a stock density of 5 to 8% and, as already mentioned, during the removal from the cylinder 7 and the wire 1 as a fiber web or fleece is disintegrated or destroyed and then is delivered as a thickened suspension from the collecting container 20 for undergoing a further suitable processing operation.

The contact or press roll 15, during the washing operation, augments the dewatering of the fiber web formed between the wire 1 and the cylinder 7 due to the so-called register roll effect. After the contact or press location of the roll 15 there is formed a so-called suction action, so that the free water which is located still in the fiber web and at the wire adheres to the surface of the roll 15. In this way there is further augmented the dewatering operation.

The action of the roll 15, during the washing operation, can be further improved through the provision of a water jet nozzle 22 which, in accordance with the illustration of the drawing, and viewed with respect to the direction of movement of the wire 1, is located forwardly of the contact or press roll 15. By providing an exactly dimensioned jet of water it is namely possible to flush the fiber material located between the wire 1 and the cylinder 7 and to loosen such fiber material, whereupon there can be accomplished a further dewatering operation by the contact or press roll 15.

Due to the suction ledge 16 which is arranged after the contact roll 15 there is augmented dewatering of the fiber material which remains at the wire 1.

The inventive wire machine is not only suitable for washing fiber material obtained from waste paper, but also can be used for simple thickening of fiber material. In such case the contact or press roll 15 together with the nozzle 22 and also the suction ledge 16 need no longer be used.

However, it should be understood that, on the other hand, there also can be provided more than one contact or press roll 15 or suction ledge 16.

As also will be evident by reverting again to the drawing, the chamber or compartment 13 is subdivided by a wire or filter 23 or equivalent structure into two partial chambers which can have special outflow or withdrawal lines. As indicated by the broken arrows, the water which has been propelled from the cylinder 7 can penetrate through the wire or filter 23 into the right-hand portion of the chamber 13, whereas solid particles entrained by the water can remain at the left-hand portion of the chamber 13. Consequently, there is rendered possible a certain pre-cleaning of the water with the aid of its kinetic energy.

As far as the spray nozzles 22 are concerned, which also can be provided in a number of rows, such can be arranged at a random location of the wrap angle W of the cylinder 7 by the wire or filter 1. A preferred arrangement, as illustrated, contemplates providing the spray nozzles 22 at a location where there has already been accomplished a partial dewatering of the fiber material, and a further dewatering follows, in the present embodiment under discussion, augmented by the action of the contact roll or cylinder 15. Due to the action of the water jets, as mentioned, there is beneficially accomplished a flushing and loosening of the already partially pressed-out fiber material, something which improves the washing operation.

While there are shown and described present preferred embodiments of the invention, it is to be distinctly understood that the invention is not limited thereto, but may be otherwise variously embodied and practiced within the scope of the following claims. Accordingly,

What we claim is:

1. A method of washing a stock suspension for removing therefrom undesired materials, comprising the steps of:
    infeeding a stock suspension from which undesired materials are to be removed between a rotatable solid cylinder and an endless revolving wire;
    tensioning the wire against the surface of the rotatable solid cylinder throughout a major part of a web forming zone located between a run-on location and a run-off location of the wire at the solid cylinder;

exerting pressure on the stock suspension between the wire and the surfce or the rotatable solid cylinder by means of the tensioned wire in order to outwardly express through the wire undesired materials contained in the stock suspension while forming a fibrous web from the stock suspension between the wire and the surface of the rotatable solid cylinder;

employing a contact roll which contacts the wire and dewaters the fiber web while being formed between the wire and the solid cylinder in the web forming zone and following said contact roll there is produced a suction action, so that free water still located in the web and at the wire adheres to the surface of said counter roll;

immediately prior to said contact roll fiber material located between the wire and the solid cylinder is flushed with a water jet to loosen said fiber material;

outfeeding the web from between the solid cylinder and the wire at said run-off location of the wire from the solid cylinder; and disintegrating the web formed from the stock suspension between the rotatable slid cylinder and the wire upon departure of the web from between the rotatable solid cylinder and the wire.

2. The method as defined in claim 1, further including the steps of:

infeeding the stock suspension in the form of a substantially flat jet to a substantially wedge-shaped space located between the wire and the surface of the rotatable solid cylinder at a location upstream of a point where the wire runs on to the rotatable solid cylinder.

3. The method as defined in claim 1, wherein:

the fibrous material is formed into a web and washed at a common web forming zone located between a run-on location and a run-off location of the wire with respect to the rotatable solid cylinder.

4. The method as defined in claim 2, wherein:

said wedge-shaped pace is located forwardly of the apex of the rotatable solid cylinder with respect to its direction of rotation and is disposed at the upper half of the rotatable solid cylinder; and removing the wire fromthe rotatable solid cylinder at a run-off location disposed forwardly of a lowermost location of the rotatable solid cylinder with respect to its direction of rotation and at the lower half of said rotatable solid cylinder, whereby there is provided a large wrap angle for the wire about the rotatable solid cylinder and removal of the web, which is to be disintegrated, from the rotatable solid cylinder and the wire is augmented by the action of gravity.

5. The method as defined in claim 2, further including the steps of:

infeeding along with the stock suspension from which undesirable materials are to be removed a washing liquid between the rotatable solid cylinder and the endless revolving wire.

6. A wire machine for washing a stock suspension to remove therefrom undesired materials, comprising:

a rotatable solid cylinder;

an endless revoling wire band to which there is infed the material which is to be filtered in the form of a suspension in a liquid and constituting a stock suspension;

said wire band being trained about a portion of the circumference of the rotatable solid cylinder;

an infeed device for forming a flat jet of the stock suspension;

said wire band and rotatable solid cylinder coacting with one another such that there is formed between the rotatable solid cylinder and the wire band travelling onto the rotatable solid cylinder and substantially wedge-shaped intermediate space;

said flat jet being directed towards said wedge-shaped intermediate space;

means for tensioning said wire band against at least a major part of said circumferential portion of said rotatable solid cylinder about which there is trained said wire band to form between said wire band and said rotatable solid cylinder a web forming zone;

means for removing solid constituents of the stock suspension adhering to the rotatable solid cylinder and the wire band and for disintegrating any web formed from the stock suspension between the rotatable solid cylinder and the wire band in said web forming zone;

a catch container operatively associated with said rotatable solid cylinder;

said catch container being provided with at least two chambers which are repsectively operatively associated with different portions of an angle of wrap of the wire band at the rotatable solid clinder;

said catch container is provided with a perforated partition wall which is previous to water and dividing said catch container into said at least two chambers;

said perforated partition wall being dimensioned so as to separate solid materials from water; and separate discharge means located to each side of said perforated partition wall.

7. The wire machine as defined in claim 6, wherein:

said wire band is trained about the rotatable solid cylinder through a predetermined wrap angle which is in the order of approximately 140° to 180°.

8. The wire machine as defined in claim 6, further including:

at least one contact roll provided for said rotatable solid cylinder for pressing the wire band against the surface of the rotatable solid cylinder.

9. The wire machine as defined in claim 6, wherein:

said wire band travels onto said rotatable solid cylinder at a predetermined run-on line;

said run-on line being located in offset relation at the region of an apex location of the rotatable solid cylinder which, viewed with respect to the direction of rotation of the rotatable solid cylinder, is offset through an angle which is less than 45°; and said wire band running-off the rotatable solid cylinder at a predetermined run-off location which is located at the region of the lower half of the rotatable solid cylinder and is arranged forwardly of the lowest location of the rotatable cylinder, viewed with respect to the direction of rotation of said rotatable solid cylinder.

10. The wire machine as defined in claim 9, further including:

at least one dewatering element provided for said wire band at the region of the run-off location of the wire band from the rotatable solid cylinder, viewed with respect to the direction of movement of the wire band.

11. The wire machine as defined in claim 9, wherein:
said dewatering element comprises a suction ledge.

12. The wire machine as defined in claim 6, further including:
spray nozzle means provided for said rotatable solid cylinder and delivering water jets against the wire band located upon said rotatable solid cylinder.

13. The wire machine as defined in claim 6, wherein:
said means for removing comprises scraper means.

* * * * *

UNITED STATES PATENT AND TRADEMARK OFFICE
CERTIFICATE OF CORRECTION

PATENT NO. : 4,501,040

DATED : February 26, 1985

INVENTOR(S) : MARIO BIONDETTI et al

It is certified that error appears in the above-identified patent and that said Letters Patent is hereby corrected as shown below:

Column 7, line 17, please delete "counter" and insert --contact--

Signed and Sealed this

Twenty-first Day of January 1986

[SEAL]

Attest:

DONALD J. QUIGG

Attesting Officer

Commissioner of Patents and Trademarks